United States Patent
Hartl

(10) Patent No.: US 10,454,079 B2
(45) Date of Patent: Oct. 22, 2019

(54) COMPONENT WITH COMPONENT REINFORCEMENT AND FEEDTHROUGH

(71) Applicant: Schott AG, Mainz (DE)

(72) Inventor: Helmut Hartl, Vienna (AT)

(73) Assignee: Schott AG, Mainz (DE)

( * ) Notice: Subject to any disclaimer, the term of this patent is extended or adjusted under 35 U.S.C. 154(b) by 270 days.

(21) Appl. No.: 14/938,410

(22) Filed: Nov. 11, 2015

(65) Prior Publication Data

US 2016/0133888 A1     May 12, 2016

(30) Foreign Application Priority Data

Nov. 11, 2014   (DE) .................. 10 2014 016 601

(51) Int. Cl.
| | |
|---|---|
| H01M 2/06 | (2006.01) |
| H01G 9/10 | (2006.01) |
| H01G 11/82 | (2013.01) |
| C03C 3/16 | (2006.01) |
| H01M 2/04 | (2006.01) |
| H01G 11/80 | (2013.01) |
| C03C 3/17 | (2006.01) |
| C03C 3/19 | (2006.01) |
| H01G 2/10 | (2006.01) |

(Continued)

(52) U.S. Cl.
CPC ............... *H01M 2/065* (2013.01); *C03C 3/16* (2013.01); *C03C 3/17* (2013.01); *C03C 3/19* (2013.01); *H01G 9/10* (2013.01); *H01G 11/80* (2013.01); *H01G 11/82* (2013.01); *H01M 2/0456* (2013.01); *H01G 2/10* (2013.01); *H01M 2/0486* (2013.01); *H01M 2/08* (2013.01); *H01M 2/30* (2013.01); *Y02E 60/13* (2013.01)

(58) Field of Classification Search
CPC .......... H01M 2/065; H01G 9/10; H01G 11/82
See application file for complete search history.

(56) References Cited

U.S. PATENT DOCUMENTS

| | | | | |
|---|---|---|---|---|
| 2008/0250963 A1* | 10/2008 | Fink | ........................ | F42B 3/103 |
| | | | | 102/202.8 |
| 2013/0029215 A1* | 1/2013 | Signorelli | .............. | H01G 11/78 |
| | | | | 429/179 |

(Continued)

FOREIGN PATENT DOCUMENTS

| | | |
|---|---|---|
| DE | 44 13 808 A1 | 11/1994 |
| DE | 101 05 587 A1 | 1/2002 |

(Continued)

OTHER PUBLICATIONS

"Handbook of Batteries", published by David Linden, 2nd issue, McGrawhill, 1995, Chapter 36 & 39 (88 pages).

*Primary Examiner* — Jonathan G Jelsma
(74) *Attorney, Agent, or Firm* — Taylor IP, P.C.

(57) ABSTRACT

A component has a component thickness and at least one feedthrough opening, wherein a conductor, such as a substantially pin-shaped conductor, is inserted through the feedthrough opening in a glass or glass ceramic material having a glass material outside dimension and a glazed length, wherein the component has a reinforcement in the region of the feedthrough opening with a component feedthrough opening thickness, wherein the component feedthrough opening thickness is greater than the component thickness and wherein the reinforcement has a reinforcement material outside dimension.

15 Claims, 2 Drawing Sheets

(51) Int. Cl.
*H01M 2/08* (2006.01)
*H01M 2/30* (2006.01)

(56) References Cited

U.S. PATENT DOCUMENTS

2013/0330605 A1* 12/2013 Kroll .......................... C03C 3/19
                                                                                429/179
2013/0337316 A1* 12/2013 Kroll .......................... C03C 3/19
                                                                                429/181

FOREIGN PATENT DOCUMENTS

| | | |
|---|---|---|
| DE | 10 2011 103 976 A1 | 12/2012 |
| WO | 2012110242 A1 | 8/2012 |
| WO | 2012110244 A1 | 8/2012 |
| WO | 2012110245 A1 | 8/2012 |
| WO | 2012110246 A1 | 8/2012 |
| WO | 2012110247 A1 | 8/2012 |

* cited by examiner

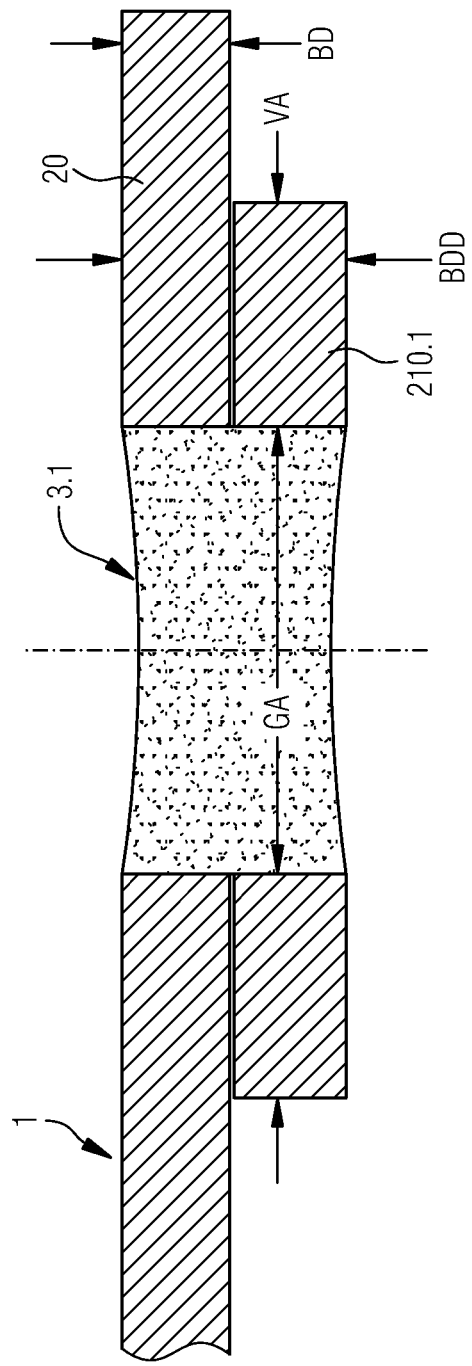

COMPONENT WITH COMPONENT REINFORCEMENT AND FEEDTHROUGH

BACKGROUND OF THE INVENTION

1. Field of the Invention

The invention relates to a component having a component thickness and at least one feedthrough opening as well as a housing, such as for an electric storage device, in particular a battery or a capacitor and a storage device comprising such a housing.

2. Description of the Related Art

When inserting conductors, in particular metal pins, into a base body consisting of light metals such as, for example, aluminum, hermetically sealed feedthroughs are required if components of this type are, for example, part of a housing for a storage device, for example batteries and/or capacitors. The batteries may, for example, be traditional energy sources, such as lead-acid batteries, nickel-cadmium batteries or nickel-metal batteries. In terms of the current invention, "a battery" is understood to be a disposable battery which is disposed of and/or recycled after its discharge, or also an accumulator.

Lithium-ion batteries have been known for many years, as evidenced by the publication "Handbook of Batteries, David Linden, Publisher, 2nd edition, McGrawHill 1995, chapter 36 and 39."

In particular for applications in the automobile field, a multitude of problems such as corrosion-resistance, stability in accidents or vibration resistance must be solved. Moreover it must be ensured that the battery is designed to be hermetically sealed over a long period of time. The hermeticity may, for example, be compromised by leakage in the region of the electrodes of the battery or, respectively, the electrode feedthrough of the battery, by a battery short-circuit or temperature changes leading to a reduced life span of the battery. In particular, the penetration of moisture into the battery cell should be avoided.

In order to ensure better stability in accidents, DE 101 05 587 A1 suggests a housing for a lithium-ion battery, wherein the housing includes a metal jacket that is open on both sides and which is being sealed. The power connection is insulated by a synthetic material. A disadvantage of synthetic material insulations is the limited temperature resistance and the uncertain hermeticity over the service life.

Feedthroughs for storage devices, for example batteries that are being inserted into a light metal, are described in a multitude of documents, for example in WO 2012/110242 A1, WO 2012/110246 A1, WO 2012/110247 A1, WO 2012/110245 A1 and, in particular, WO 2012/110244 A1, whose disclosure content is incorporated in its entirety by reference.

DE 10 2011 103 976 A1 also shows a feedthrough, in particular through a housing component, wherein thicknesses are specified for the base body without specifying a ratio of the glass material outside dimensions relative to the reinforcement material outside dimensions.

DE 44 13 808 B3 shows an electrochemical cell as well as the production of such cells. The electrochemical cell includes an active anode material and an active cathode material, as well as a holding frame. Dimensions of the electrochemical cell in the embodiment of a button cell are not specified.

A disadvantage of the feedthroughs as described, for example, in WO 2012/110244 A1 was that the base body generally had a thickness that was consistent with the glazing length. Due to this, the housing components had a relatively high weight and an interior space that was too small, so that volume was lost in a battery cell.

When intending to produce housing components, it was necessary to produce a thickening by means of machining from a solid material. An additional problem existed in that hermeticity was not achieved due to insufficient pre-stressing.

What is needed in the art is a component that addresses some of the described disadvantages.

SUMMARY OF THE INVENTION

According to the present invention, a component that is thin and light in conjunction with the required hermeticity is provided.

Hermeticity is understood to mean that, at a pressure differential of 1 bar, the helium leakage rate is $<1 \cdot 10^{-6}$ mbar 1 s$^{-1}$ such as $<1 \cdot 10^{-8}$ mbar 1 s$^{-1}$, meaning that the leakage rate is, at maximum, $1 \cdot 10^{-6}$ mbar 1 s$^{-1}$ such as a maximum leakage rate of $1 \cdot 10^{-8}$ mbar 1 s$^{-1}$.

The hermeticity ensures that the serviceable life of an electric storage device, such as a battery, is considerably extended. Hermeticity is also guaranteed if the pin-shaped conductor that is inserted through the glass or glass ceramic material heats up momentarily due to high currents and/or short circuit. The hermetic seal also prevents, in particular, that moisture can penetrate into the battery cell.

The component according to the invention has a component thickness (BD) and at least one feedthrough opening through which a conductor, such as a substantially pin-shaped conductor, is inserted in a glass or glass ceramic material having a glass material that has an outside dimension (GA) and a glazed length (EL), has a reinforcement in the region of the feedthrough opening with a component feedthrough opening thickness (BDD), wherein the component feedthrough opening thickness (BDD) is greater than component thickness (BD). The reinforcement has a reinforcement material outside dimension (VA). According to the invention, it was found that, in order to meet the above requirements, the ratio of the glass material outside dimension (GA) relative to reinforcement material outside dimension (VA) is greater than or equal to 1 to 1.2, in other words GA/VA≧1/1.2 applies. The ratio GA/VA can be, for example, in the range of 1/1.2 to 1/2.2. Specifically this condition means that, with a cylindrical glass material and with a circular reinforcement ring, the ratio of the outside diameter of the cylindrical reinforcement ring is greater than or equal to 1 to 1.2, and can be in the range of 1 to 1.2 to 1 to 2.2. By selecting such a ratio of GA/GV it is surprisingly achieved that a sufficient pressure can be applied onto the glass material in the region of the feedthrough openings so that hermeticity is provided. Moreover, the compression necessary for hermeticity is applied onto the glass by the outside dimensional width of the reinforcement, which also supports the hermeticity.

The advantage of the inventive arrangement is that a very thin and therefore weight-saving material can be used for the component. This is useful if the component is used as part of a housing, for example a housing for a storage device, for example a battery housing, such as a battery cover or of a capacitor, such as a capacitor cover.

According to the present invention, a reinforcement ring that is larger in its outside dimensions than the substantially cylindrical glass material can surprisingly apply a sufficient pressure onto the glass material in the region of the feedthrough opening, so that hermeticity as previously described occurs. Moreover, sufficient strength is thus provided in the region of the feedthrough.

The component feedthrough thickness in the region of the reinforcement is substantially consistent with the sealed glass length (EL) in order to provide a hermetically sealed feedthrough. This allows a greater mechanical strength of the glazed anodes or cathodes to be achieved.

An embodiment of the invention may provide that the component has a very thin base body that, for example, forms the housing cover, having a component thickness (BD) and that a separate reinforcement component having a reinforcement component thickness (VD) is arranged in the region of the insertion opening so that the thicknesses of the component—namely the component thickness (BD) and the reinforcement component thickness (VD)—add up to the component feedthrough opening thickness (BDD).

Alternatively to a separate component that is arranged in the region of the component feedthrough opening, for example a ring beneath the base body in the region of the feedthrough opening, it may be provided that the base body with component thickness (BD) and the reinforcement component are combined in a single component, whereby in the region of the component feedthrough opening the component feedthrough opening thickness (BDD) is provided. This may, for example, occur in that a very thin base body is deep drawn in the region of the feedthrough opening. In order to develop the necessary greater dimensions in the region of the reinforcement, the base body is upset subsequent to the deep draw.

In an additional alternative embodiment of the invention, the base body with component thickness (BD) plus the reinforcement component are again a single component, wherein the component feedthrough thickness (BDD) is provided in the region of the component feedthrough opening. In the additional alternative this occurs in that the very thin base body in the region of the feedthrough opening is bent, drawn from a sheet metal part and subsequently folded. The width of the reinforcement is then greater than the thickness of the base body.

Because the width of the reinforcement in its material outside dimensions, as described above, is greater than 1.2× the outside dimensions of the glass material, the compression necessary for a hermetic seal can be applied upon the glass, thereby providing a hermetically sealed feedthrough. In order to achieve sufficient hermeticity, it is useful if the glazed length is greater than 1.5 mm, such as in the range of 1.5 mm to 8 mm.

It is useful to use thin components that have sufficient stability and that, during transformation with subsequent compressing, also still provide sufficient reinforcement that is at least in the range of the sealed glass length, such as at least the sealed glass length plus 2 mm, for example 3.5 mm to 10 mm.

It is useful if the material that is used for the component, such as for the base body as well as the reinforcement component, includes a light metal having a specific weight of <5 kg/dm$^3$ and/or a melting point in the range of 350° C. to 800° C. and/or an electric conductivity in the range of 5·10$^6$ S/m to 50·10$^6$ S/m and/or a coefficient of expansion a (20° C. to 300° C.) in the range of 18·10$^{-6}$/K to 30·10$^{-6}$/K.

The light metal materials can be aluminum, an aluminum alloy, magnesium, a magnesium alloy or also other metals and alloys such as high grade steel. The inventive component can be a cover component of a housing, such as a housing for an electric storage device, wherein the storage device can, for example, be a battery or a capacitor.

In addition to the housing, the present invention also provides a storage device, such as a battery or a capacitor, equipped with suchlike component, at least in the embodiment of a cover component through which the feedthrough is inserted.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a cross-sectional view of another embodiment according to the present invention in the form of a single component with reinforcement segments.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
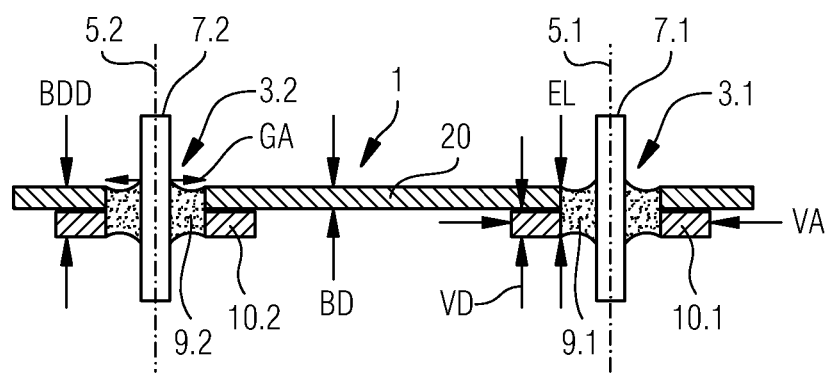
FIG. 1 is a cross-sectional view of an embodiment according to the present invention with a separate reinforcement component.

FIG. 1 illustrates a component 1 according to the present invention having two feedthrough openings 3.1, 3.2. The feedthrough openings can have a cylindrical shape around axis 5.1 or, respectively, axis 5.2, for example a round shape or an oval shape.

Conductors 7.1, 7.2, shown as pins, are fed through feedthrough openings 3.1, 3.2 in a glass material 9.1, 9.2.

The thickness of the component is BD, the component feedthrough opening thickness is BDD and the thickness of the separate reinforcement components 10.1, 10.2 is VD.

As seen in FIG. 1, the component feedthrough opening thickness BDD is equal to BD plus VD.

The outside dimension of glass material 9.1, 9.2 is GA. With a circular or oval glass material, this is consistent with the diameter of the glass plug.

The reinforcement material outside dimensions VA, of the separate reinforcement component, which can be circular or annular, are 1.2-times the outside dimensions GA of the glass material. In other words, with circular or, respectively, round glass plugs and circular or, respectively, round reinforcement material, the diameter of the reinforcement material is at least 1.2-times the diameter of the glass material.

Also shown in FIG. 1 is length EL of the glazing into the component feedthrough opening. In the illustrated component, the length EL of the glazing is consistent with the length of the component feedthrough opening or, respectively, the component feedthrough thickness BDD.

It is also possible that the glazing length EL is shorter than the component thickness BD, but not vice versa.

As material for base body 20 that represents primarily a housing component, such as a cover part, for example for a storage device such as a battery, a light metal having a specific weight of <5 kg/dm3 and/or a melting point in the range of 350° C. to 800° C. and/or an electric conductivity in the range of 5·10$^6$S/m to 50·10$^6$ S/m and/or a coefficient of expansion a (20° C. to 300° C.) in the range of 18·10⁻⁶/K to 30·10⁻⁶/K can be used. The light metals can be aluminum, aluminum alloys, magnesium, magnesium alloys. The material of conductor pins 7.1, 7.2 can be a metal, such as copper, Cusic, a copper alloy, ASC, silver, a silver alloy, gold or a gold alloy or also aluminum or an aluminum alloy.

As a glass material for glazing 9.2, a phosphate glass can be used, with one such glass described in WO 2012/110247 whose disclosure content is included in its entirety by reference.

Figure 2:
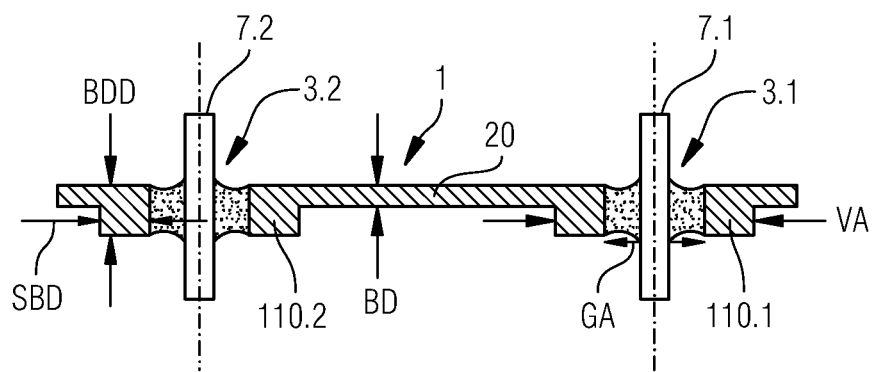
FIG. 2 is a cross-sectional view of another embodiment according to the present invention in the form of a single component with reinforcement segments.

FIG. 2 illustrates an alternative embodiment of the invention with same components as in FIG. 1 identified with the same reference numbers.

The component is again identified with 1, however, in contrast to FIG. 1, it is now no longer a two-part component in the region of component feedthrough openings 3.1, 3.2, but is a single part. In other words, in the region of component feedthrough openings 3.1, 3.2, base body 20 includes thickenings 110.1, 110.2 which are obtained in that component 1, in the region of reinforcement 110.1, 110.2, is deep-drawn, resulting in the component receiving a thickness BDD in the region of the component feedthrough opening.

Thickness BDD is always greater than thickness BD of the component. Due to forming by deep drawing and subsequent upsetting, the shape of reinforcement illustrated in FIG. 2 is achieved, wherein the outside diameter VA in the region of the reinforcement element is 1.2 times greater than the outside diameter of glazing GA.

With a thickness BDD, the thickness of the upset reinforced region is also greater than thickness BD of the base material. The width of the upset reinforced region is identified with SBD.

The treatment in the region of the reinforcement can be made visible, since the structure flow lines, in contrast to a component treated in a machining process, in the region of the upsetting treatment are bent by the forming process.

An additional alternative arrangement according to the present invention is illustrated in FIG. 3.

The component is again identified with 1. Identical components as in FIG. 1 are identified with the same reference numbers. However, in contrast to FIG. 1, it is now no longer a two-part component in the region of component feedthrough openings 3.1, 3.2, but is a single part. In other words, base body 20 includes, in the region of component feedthrough openings 3.1, 3.2, thickenings 210.1, 210.2 which are obtained by deep drawing component 1 in the region of reinforcement 210.1, 210.2 and subsequent folding, resulting in the component receiving a thickness BDD in the region of the component feedthrough opening. Due to folding, thickness BDD is approximately twice the thickness BD of the component in the illustrated embodiment. Due to forming by deep drawing and subsequent folding, the shape of the reinforcement illustrated in FIG. 3 is achieved, wherein outside diameter VA in the region of the reinforcement element is 1.2 times greater than the outside diameter of glazing GA.

The thickness of the reinforced region with a thickness of approximately 2×BD is greater than the thickness of the base material BD. Instead of the single fold, a multiple fold, for example a 3-time or 4-time fold, is also possible in order to adjust the thickness in the region of the reinforcement.

The treatment in the region of the reinforcement can be made visible since the structure flow lines, in contrast to a component treated in a machining process, in the region of the upsetting treatment or, respectively, folding are bent by the forming process.

The material of the component, in other words of the base body including the reinforcement region, can be a light metal as already described for the base body in FIG. 1.

The second and third alternative that are previously described do not require the attachment of an additional component, namely the reinforcement ring.

Glass materials that include the following components in mol-% can be used:

| | |
|---|---|
| $P_2O_5$ | 35-50 mol-%, such as 39-48 mol-% |
| $Al_2O_3$ | 0-14 mol-%, such as 2-12 mol-% |
| $B_2O_3$ | 2-10 mol-%, such as 4-8 mol-% |
| $Na_2O$ | 0-30 mol-%, such as 0-20 mol-% |
| $M_2O$ | 0-20 mol-%, such as 12-20 mol-%, where M can be K, Cs, or Rb |
| PbO | 0-10 mol-%, such as 0-9 mol-% |
| $Li_2O$ | 0-45 mol-%, such as 0-40 mol-%, or 17-40 mol-% |
| BaO | 0-20 mol-%, such as 5-20 mol-% |
| $Bi_2O_3$ | 0-10 mol-%, such as 1-5 mol-%, or 2-5 mol-% |

The glass material can be composed such that it has a coefficient of expansion a in the range of 20° C. to 300° C.≥13·10⁻⁶/K that can be 13·10⁻⁶/K to 25·10⁻⁶/K.

The invention provides a thin housing component, such as for a housing of a storage device, that has a very thin material thickness BDD and thus a low weight and large cell volume, as well as a hermetically sealed glazing having a glazing length EL in the region of the feedthrough opening for the conductors.

In particular, it is possible to also provide sufficient compression for a hermetically sealed feedthrough due to a forming process, even in the case of a single-part component.

On the one hand, the necessary mechanical strength with thin materials that are utilized in housings, for examples as lids, is increased and, on the other hand, provides the necessary pressures or respectively radial forces for the hermetically sealed glazing.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device, comprising:
   a component having a component thickness and at least one feedthrough opening and defining a region of said feedthrough opening, said component having a reinforcement in said region that has a component feedthrough opening thickness that is greater than said component thickness and a single reinforcement material outside dimension; and
   a conductor inserted through said feedthrough opening in one of a glass material and a glass ceramic material having a glass material outside dimension and a glazed length and wherein said one of said glass material and said glass ceramic material contacts said component at said at least one feedthrough opening, wherein said single reinforcement material outside dimension is in a range of 1.2 to 2.2 times said glass material outside dimension.

2. The device according to claim 1, wherein said conductor is a substantially pin-shaped conductor.

3. The device according to claim 1, wherein said component feedthrough opening thickness of said reinforcement is consistent with said glazed length.

4. The device according to claim 1, wherein said component comprises a base body having said component thickness and a separate reinforcement component having a reinforcement component thickness, said reinforcement component thickness and said component thickness adding up to equal said component feedthrough opening thickness.

5. The device according to claim 1, wherein said component comprises a base body having said component thickness and a reinforcement component forming a single component with said base body, wherein said component feedthrough opening thickness is provided in said region of said component feedthrough opening.

6. The device according to claim 1, wherein said glazing length is greater than 1.5 mm.

7. The device according to claim 1, wherein said glazing length is in a range of 1.5 mm to 8 mm.

8. The device according to claim 1, wherein said component thickness is at least as large as said glazing length.

9. The device according to claim 8, wherein said component thickness is equal to said glazing length plus 2 mm.

10. The device according to claim 9, wherein said component thickness is in a range of 3.5 mm to 10 mm.

11. The device according to claim 1, wherein said component includes at least partially a light metal having at least one of a specific weight of <5 kg/dm$^3$, a melting point in a range of 350° C. to 800° C., an electric conductivity in a range of $5 \cdot 10^6$ S/m to $50 \cdot 10^6$ S/m, and a coefficient of expansion α (20° C. to 300° C.) in a range of $18 \cdot 10^{-6}$ / K to $30 \cdot 10^{-6}$ / K.

12. The device according to claim 11, wherein said light metal is one of aluminum, an aluminum alloy, magnesium, a magnesium alloy, titanium or a titanium alloy.

13. The device according to claim 1, wherein said device is a housing.

14. The device according to claim 13, wherein said housing is a part of at least one of an electric storage device, a battery, and a capacitor.

15. The device according to claim 1, wherein said component forms a housing cover.

* * * * *

UNITED STATES PATENT AND TRADEMARK OFFICE
CERTIFICATE OF CORRECTION

PATENT NO. : 10,454,079 B2
APPLICATION NO. : 14/938410
DATED : October 22, 2019
INVENTOR(S) : Helmut Hartl Page 1 of 1

It is certified that error appears in the above-identified patent and that said Letters Patent is hereby corrected as shown below:

In the Specification

Column 3
At Line 60, please delete "expansion a", and substitute therefore --expansion α--.

Column 5
At Line 1, please delete "expansion a", and substitute therefore --expansion α--.

Column 6
At Line 23, please delete "expansion a", and substitute therefore --expansion α--.

Signed and Sealed this
Tenth Day of November, 2020

Andrei Iancu
*Director of the United States Patent and Trademark Office*